United States Patent
Lee

(10) Patent No.: US 12,504,674 B2
(45) Date of Patent: Dec. 23, 2025

(54) CAMERA MODULE

(71) Applicant: Samsung Electro-Mechanics Co., Ltd., Suwon-si (KR)

(72) Inventor: Iksun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 165 days.

(21) Appl. No.: 17/971,798

(22) Filed: Oct. 24, 2022

(65) Prior Publication Data

US 2023/0176451 A1  Jun. 8, 2023

(30) Foreign Application Priority Data

Dec. 8, 2021 (KR) .................. 10-2021-0174872

(51) Int. Cl.
*G03B 17/17*   (2021.01)
*G03B 17/56*   (2021.01)

(52) U.S. Cl.
CPC .......... *G03B 17/17* (2013.01); *G03B 17/561* (2013.01)

(58) Field of Classification Search
CPC .. G03B 17/17; G03B 17/561; G03B 2217/00; G03B 2217/002
See application file for complete search history.

(56) References Cited

U.S. PATENT DOCUMENTS

| | | |
|---|---|---|
| 2015/0296143 A1 | 10/2015 | Kang et al. |
| 2017/0085798 A1 | 3/2017 | Kang et al. |
| 2020/0348479 A1 | 11/2020 | Kwon et al. |
| 2021/0294184 A1* | 9/2021 | Kim .......... G03B 17/17 |
| 2022/0099947 A1* | 3/2022 | Im .......... G02B 27/646 |
| 2022/0221771 A1* | 7/2022 | Hur .......... G03B 3/10 |

FOREIGN PATENT DOCUMENTS

| | | |
|---|---|---|
| KR | 10-2136994 B1 | 7/2020 |
| KR | 10-2020-0118391 A | 10/2020 |
| KR | 10-2020-0126873 A | 11/2020 |

* cited by examiner

*Primary Examiner* — Stephanie E Bloss
*Assistant Examiner* — Fang-Chi Chang
(74) *Attorney, Agent, or Firm* — NSIP Law

(57) ABSTRACT

A camera module is provided. The camera module includes a housing including an inner space; a folded module including a reflective member reflecting light incident to the reflective member and changing a path of the light, and a moving holder to which the reflective member is mounted, wherein the folding module is disposed in the inner space and is movably supported on an inner wall of the housing; a lens module disposed adjacent to the folded module, and including a lens barrel including plural lenses aligned in an optical axis direction to allow light reflected from the reflective member to pass therethrough; and a damper including a support frame disposed between the folded module and the lens module in the housing, a first cushioning portion fixed to the support frame, and a second cushioning portion extended integrally from the first cushioning portion and spaced apart from the support frame.

12 Claims, 12 Drawing Sheets

CAMERA MODULE

CROSS-REFERENCE TO RELATED APPLICATIONS

This application claims the benefit under 35 USC § 119(a) of Korean Patent Application No. 10-2021-0174872 filed on Dec. 8, 2021, in the Korean Intellectual Property Office, the entire disclosure of which is incorporated herein by reference for all purposes.

BACKGROUND

1. Field

The following description relates to a camera module.

2. Description of Related Art

With the remarkable development of information communication technology and semiconductor technology, the dissemination and implementation of electronic devices is rapidly increasing. The electronic devices do not stay in their traditional unique domains, but tend to provide various functions by convergence.

Recently, cameras have been basically adopted in portable electronic devices such as smartphones, tablet personal computers (PCs), and laptop computers. Additionally, an auto focus (AF) function or operation, an image stabilization (IS) function or operation, and a zoom function or operation have being added to cameras of the portable electronic devices.

The image stabilization function may include both camera shake compensation and hand shake compensation, and thus vibration of a photographed image of a subject that may occur when the camera is in a moving or stationary state, and hand shake or camera shake that unintentionally occur by a photographer can be prevented.

The auto-focus function is a function that enables a clear image to be acquired from an imaging plane of an image sensor by moving a lens positioned in front of the image sensor along an optical axis direction according to a distance of the image sensor from the subject. Such an auto-focus function has been installed in expensive electronic devices, but now it has become an essential function installed in low-cost distributed electronic devices.

Additionally, as the high performance of the camera module progresses, it is necessary to secure reliability such as reducing the impact between the lens and the counterpart and preventing noise in order to smoothly implement the auto-focus function, image stabilization function, and zoom function.

The above information disclosed in this Background section is only for enhancement of understanding of the background of the invention, and therefore it may contain information that does not form the prior art that is already known in this country to a person of ordinary skill in the art.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing comprising an inner space; a folded module comprising a reflective member configured to reflect light incident from the outside, and change a path of the light, and a moving holder to which the reflective member is mounted, wherein the folding module is disposed in the inner space of the housing, and is movably supported on an inner wall of the housing; a lens module that is disposed adjacent to the folded module in the inner space, and including a lens module that is disposed to a rear of the folded module in the inner space, and comprising a lens barrel including a plurality of lenses aligned in an optical axis direction and configured to allow the light reflected from the reflective member to pass therethrough; and a damper comprising a support frame fixed between the folded module and the lens module in the housing, a first cushioning portion fixed to the support frame, and a second cushioning portion that extends integrally from the first cushioning portion, and is spaced apart from the support frame.

The support frame includes a support portion that extends in a first direction, and a fastening portion that is bent in a second direction that intersects the first direction at one end of the support portion, and the first cushioning portion may be fixed to the support portion.

The first direction may be parallel to a direction in which the light is incident on the reflective member, and the second direction may be parallel to a direction of the optical axis, and the first cushioning portion and the second cushioning portion may be disposed to face the second direction.

The first cushioning portion and the second cushioning portion may be disposed to face the folded module.

The first cushioning portion and the second cushioning portion may be disposed to face toward the lens module.

The fastening portion includes a coupling hole cut along a central portion of the fastening portion.

The support portion may include an opening that penetrates in the second direction, and the second cushioning portion may be disposed to correspond to the opening in the second direction.

The opening may be formed as a slot hole that extends in the first direction, and the first cushioning portion may be fixed to both edges of the opening spaced apart in the first direction.

The second cushioning portion may include a throughhole that penetrates in the second direction.

The through-hole may be formed as a slot hole that extends in the first direction.

The second cushioning portion may extend in parallel with the support portion from the first cushioning portion.

The second cushioning portion may form a free end at an end that is separated from the first cushioning portion.

In a general aspect, a camera module includes a housing including an inner space; a folded module comprising a reflective member configured to reflect light incident from the outside, and change a path of the light, and a moving holder to which the reflective member is mounted, wherein the folding module is disposed in the inner space of the housing, and is movably supported on an inner wall of the housing; a lens module that is disposed to a rear of the folded module in the inner space, and comprising a lens barrel including a plurality of lenses aligned in an optical axis direction and configured to allow the light reflected from the reflective member to pass therethrough; and a damper comprising a support frame fixed between the folded module and the lens module in the housing, a first cushioning portion fixed to the support frame, and a second cushioning portion integrally formed from the first cushioning portion to have a shape of which a central portion is recessed.

The support frame may include a support portion that extends in a first direction, and a fastening portion that is bent in a second direction that intersects the first direction at one end of the support portion, and the first cushioning portion may be fixed to the support portion.

The first direction may be parallel to a direction in which the light is incident on the reflective member and the second direction is parallel to a direction of the optical axis, and the first cushioning portion and the second cushioning portion may be disposed to face the second direction.

The second cushioning portion may be formed at a lower height than a height of the first cushioning portion based on the surface of the support portion.

The fastening portion may include a coupling hole cut along a central portion.

The support portion may include an opening that penetrates in the second direction, and the first cushioning portion is fixed to surround an edge of the opening, and the second cushioning portion is disposed to correspond to the opening.

The opening may be formed as a slot hole that extends in the first direction.

The second cushioning portion may include a through-hole that penetrates in the second direction.

In a general aspect, an apparatus includes a camera module, including a prism module, movably disposed in a housing of the camera module, and configured to reflect a direction of light incident thereto; a lens module, movably disposed in the housing; and a damper, disposed between the prism module and the lens module, wherein the damper includes a fixed portion, fixed to a support frame of the damper; a deformable portion, spaced apart from the support frame, and configured to contact one of the prism module and the lens module to absorb a primary impact force, and secondary impact areas located at an upper portion of the fixed portion and a lower portion of the fixed portion, and configured to contact one of the prism module and the lens module to absorb a secondary impact force.

The deformable portion may be disposed at a central area of the damper.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
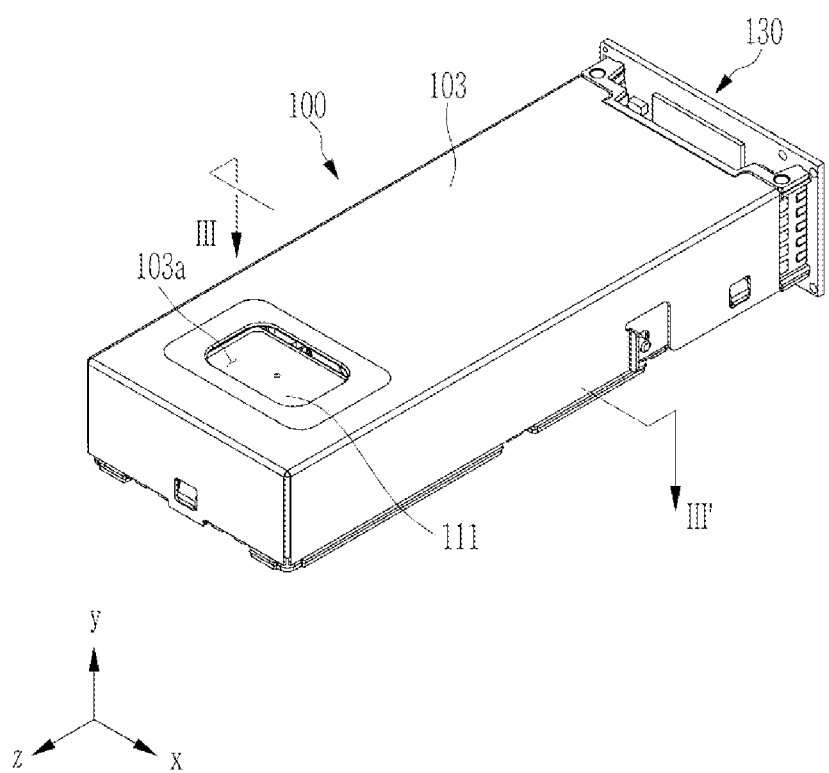
FIG. 1 illustrates a perspective view of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

In addition, the attached drawing is only for easy understanding of the one or more examples, and the technical idea disclosed in this specification is not limited by the attached drawing, and all changes included in the spirit and technical range of the one or more examples, should be understood to include equivalents or substitutes.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Further, throughout the specification, the phrase "on a plane" means viewing a target portion from the top, and the phrase "on a cross-section" means viewing a cross-section formed by vertically cutting a target portion from the side.

One or more examples may provide a camera module that is advantageous in reducing the impact and preventing annoying noise between a lens driven inside the module and a counterpart mechanism.

Figure 2:
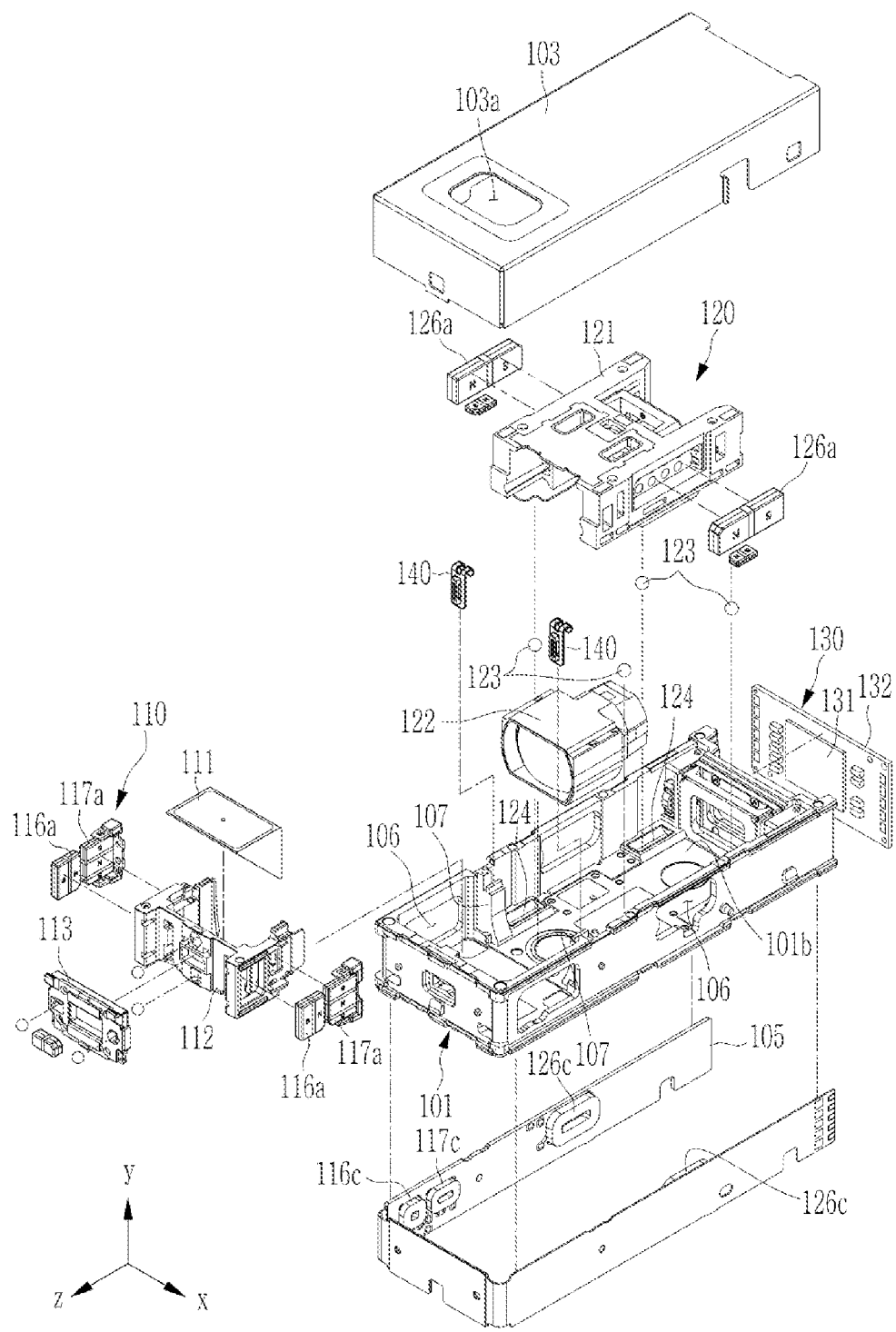
FIG. 2 illustrates a schematic exploded perspective view of the example camera module FIG. 1.

FIG. 1 illustrates a perspective view of an example camera module, in accordance with one or more embodiments, and FIG. 2 is a schematic exploded perspective view of the example camera module FIG. 1.

Referring to FIG. 1 and FIG. 2, a camera module 100, in accordance with one or more embodiments, may include a folded module or prism module 110, a lens module 120, and an image sensor module 130. The folded module 110 and the lens module 120 are housed inside a housing 101. The cover 103 partially surrounds an upper portion and a part of a side surface of the housing 101, and partly forms the exterior of the camera module 100.

The folded module 110 may be formed to convert a direction of light incident from the outside. The light entering the camera interior through an opening 103a of a cover 103 may be reflected toward the lens module 120 by the folded module 110. In the present embodiment, the folded module 110 includes a reflective member 111, and the reflective member 111 may be provided, for example, in the form of a prism or mirror.

The lens module 120 includes a carrier 121 movably provided in the inner space of the housing 101 in an optical axis direction, and a lens barrel 122 fixed to the carrier 121 and having at least one lens therein. The light reflected from the folded module 110 is refracted as it passes through the lens module 120. The light passing through the lens module 120 is incident on the image sensor 131. When the lens module 120 includes a plurality of lenses, the plurality of lenses may be arranged in the optical axis direction.

The image sensor module 130 may include an image sensor 131 and a board 132 on which the image sensor 131 is mounted. An image is formed on an image forming surface (or upper surface) of the image sensor 131, and accordingly, the image sensor 131 generates an image signal for the formed image, and the image signal may be transmitted to an external circuit through the board 132.

The camera module 100, in accordance with one or more embodiments, may provide an auto-focus (AF) operation and an optical image stabilization (OIS) operation.

The lens module 120 may adjust a focal length while reciprocating along the optical axis. In an example, an AF driver may be disposed on the side of the lens module 120. In the one or more examples, an AF magnet 126a may be mounted on the lens module 120, and an AF coil 126c may be disposed at a position opposite to the AF magnet 126a. Electromagnetic interaction between the AF coil 126c and the AF magnet 126a causes the lens module 120 to move along the optical axis. The AF coil 126c is mounted on the board 105 attached to the housing 101, and the housing 101 may have an opening 106 such that the AF coil 126c and the AF magnet 126a face each other.

Ball members 123 may be disposed between the lens module 120 and a bottom surface 101b of the housing 101 for smooth operation. The lens module 120 and the bottom surface 101b of the housing 101 may include guide grooves 124 that partially receive the ball members 123. Guide grooves 124 extend in a direction parallel to the optical axis, and the motion direction of the ball members 123 is limited by the extension direction (i.e., optical axis direction) of the guide grooves 124.

A pulling device that pulls the lens module 120 to the bottom surface 101b of the housing 101 may be disposed between the lens module 120 and the housing 101. In the one or more embodiments, the pulling device may include the AF magnet 126a and a yoke disposed on the bottom surface 101b of the housing 101. In another embodiment, a separate magnet distinguished from the AF magnet 126a may be mounted on the bottom surface of the lens module 120, and the yoke may be disposed in a portion facing the separate magnet.

The magnetic attraction between the yoke and the AF magnet 126a (or a separate magnet) draws the lens module 120 to the bottom surface 101b of the housing 101. Accordingly, the ball members 123 may maintain a close contact state with the lens module 120 and the guide groove 124 of the bottom surface 101b of the housing 101, and accordingly the movement in the optical axis direction of the lens module 120 is smoothened. That is, the pulling device prevents the lens module 120 from moving in a direction other than the optical axis direction (e.g., y-axis direction or x-axis direction), and contributes to improving AF performance.

In an example, a position sensor may measure a position in the optical axis direction of the lens module 120 may be disposed inside or outside the AF coil.

The OIS operation may be implemented by rotating the folded module 110 about an axis that is perpendicular to the optical axis.

The folded module 110 may include an OIS driver that rotates the reflective member 111 relative to the housing 101 about an axis perpendicular to the optical axis. The OIS driver may include a first OIS driver that rotates the reflective member 111 based on a first axis perpendicular to the optical axis, and a second OIS driver that rotates the reflective member 111 based on a second axis perpendicular to the optical axis and intersects the first axis. For example, the optical axis may be parallel to the z-axis in the drawing, the first axis may be parallel to the y-axis in the drawing, and the second axis may be parallel to the x-axis in the drawing.

It is possible to optically correct the shaking of the image formed on the image sensor 131 due to the shaking of the camera module 100 by rotating the reflective member 111 based on the first axis and/or second axis by the OIS driver.

A first OIS driver may be disposed on both sides of a moving holder 112. The first OIS driver may include a first OIS magnet 116a mounted on both sides of the moving holder 112 and a first OIS coil 116c disposed on a portion or side opposite to the first OIS magnet 116a. The first OIS coil 116c may be fixedly coupled to the housing 101, and electromagnetic interaction between the first OIS coil 116c and the first OIS magnet 116a causes the moving holder 112 to rotate relative to the housing 101 about a first axis perpendicular to the optical axis.

Additionally, a second OIS driver may be disposed on both sides of the moving holder 112 adjacent to the first OIS driver. The second OIS driver may include a second OIS magnet 117a mounted on both sides of the moving holder 112 and a second OIS coil 117c disposed on a portion facing the second OIS magnet 117a. The second OIS coil 117c may be fixedly coupled to the housing 101, and the moving holder 112 can rotate with respect to the housing 101 about the second axis perpendicular to the optical axis by electromagnetic interaction between the second OIS coil 117c and the second OIS magnet 117a.

In an example, the first OIS coil 116a and the second OIS coil 117a may be attached to the board 105, and the board 105 may be fixed to the housing 101. The housing 101 may include openings 106 formed to expose the first OIS coil 116c and the second OIS coil 117c into the housing 101.

A position sensor formed to measure a rotation angle of the moving holder 112 may be disposed on the inside or outside of the coil. According to rotation of a middle guide 113 (or the moving holder 112), a position of a position sensor with respect to the OIS magnets 116a and 117a changes, and the rotational displacement of the middle guide 113 (or the moving holder 112) can be measured based on the position change. The position sensor may include, for example, a magnetic sensor such as a Hall sensor or a magnetoresistive sensor.

An interior space of the housing 101 can be separated by a protruding wall 107 between a space where the folded module 110 is disposed and a space where the lens module 120 is disposed. That is, the folded module 110 may be provided on a front side of the housing 101 based on the protruding wall 107, and the lens module 120 may be provided on the rear side of the housing 101. Such a protruding wall 107 may be provided in a shape protruded from both inner walls of the housing 101 to the inner space.

Figure 5:
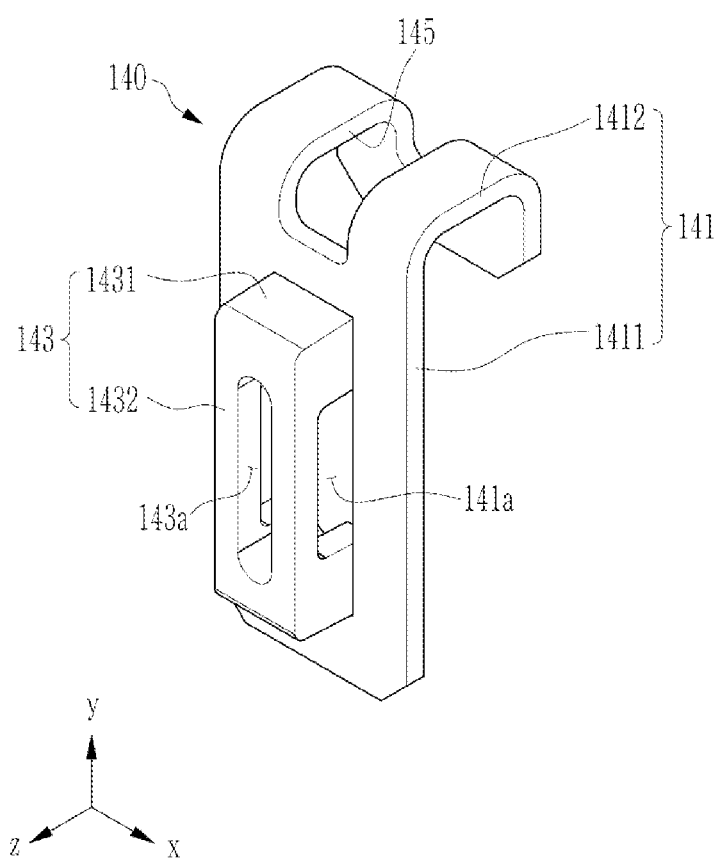
FIG. 5 illustrates a perspective view of the damper applied to the example camera module shown in FIG. 1.

A damper 140 may be secured between the folded module 110 and the lens module 120 inside the housing 101, and includes a support frame 141 and a cushioning member 143 (FIG. 5). The support frame 141 may be formed of a metal, and may be fixed inside the housing 101 by fitting it into the protruding wall 107. The cushioning member 143 may be formed to mitigate noise or impact generated when contacting the folded module 110, and, in a non-limited example, the cushioning member 143 may be formed of urethane, rubber, or silicone, as only examples. The damper 140 may be formed to be disposed on one side of the folded module 110 to limit a driving range of the folded module 110.

Figure 3:
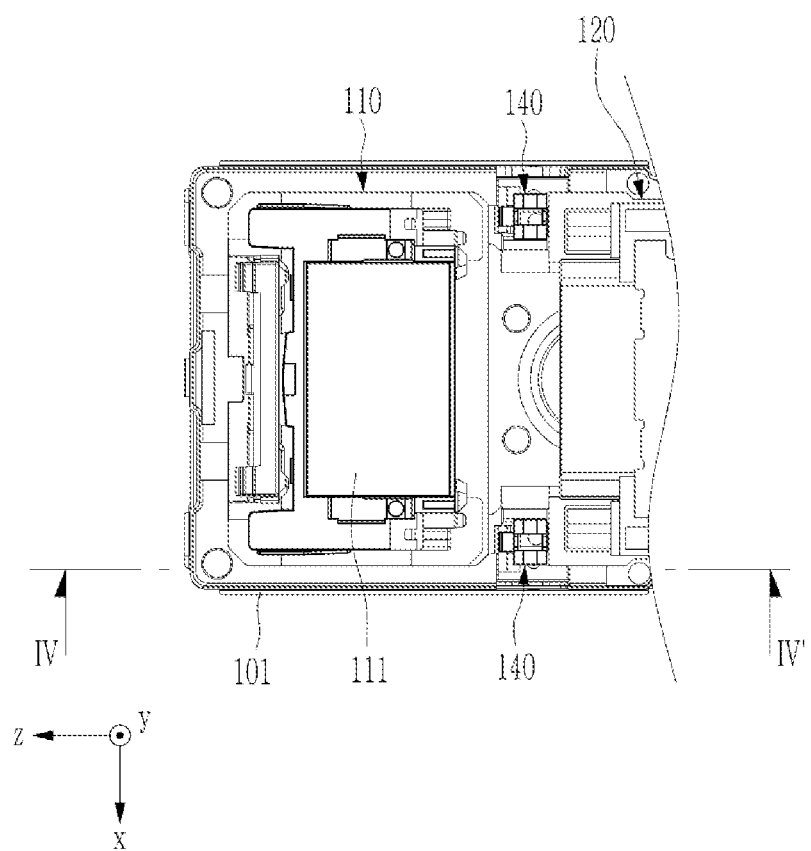
FIG. 3 illustrates a cross-sectional view of a part of the example camera module of FIG. 1, taken along the line III-III'.
Figure 4:
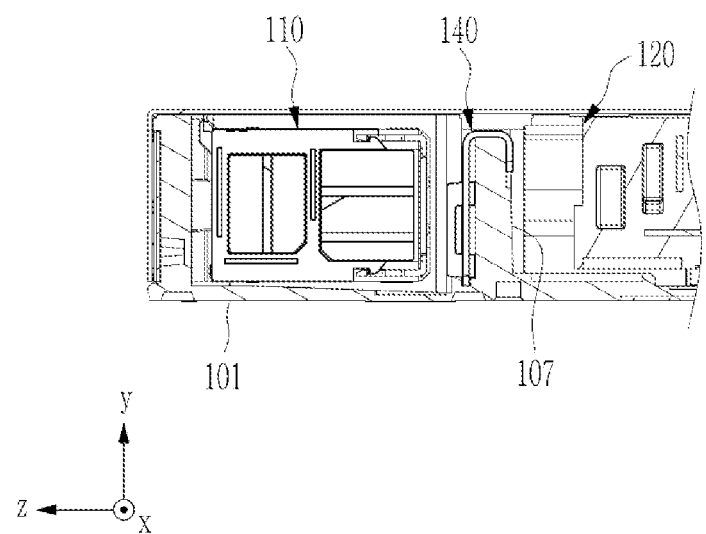
FIG. 4 illustrates a cross-sectional view of a part of FIG. 3, taken along the line IV-IV'.
Figure 6:
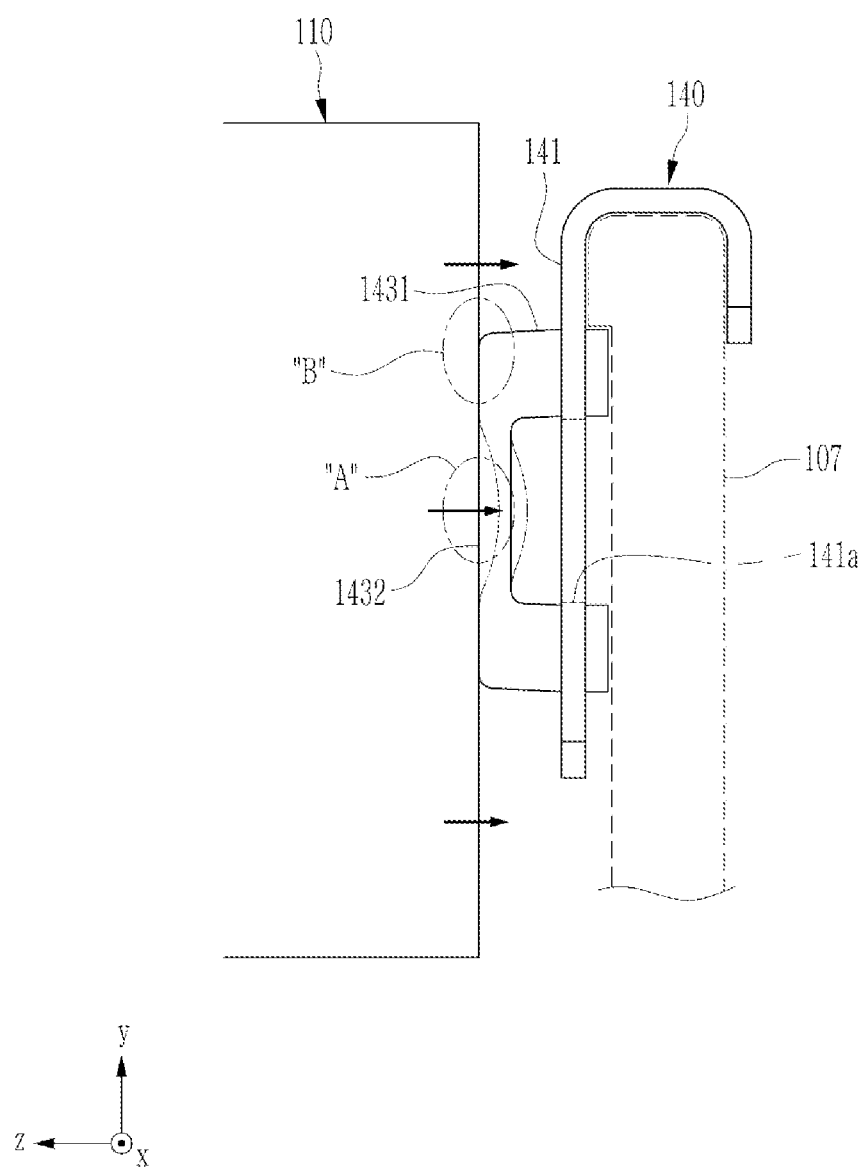
FIG. 6 illustrates a side view of the damper of FIG. 5.

FIG. 3 illustrates a cross-sectional view of a part of the camera module of FIG. 1, taken along the line III-III', and FIG. 4 illustrates a cross-sectional view of a part of FIG. 3, taken along the line IV-IV'. Additionally, FIG. 5 is a perspective view of the damper applied to the camera module shown in FIG. 1, and FIG. 6 is a side view of the damper of FIG. 5, which is provided for description of an operation state of the damper.

Referring to FIG. 3 to FIG. 6, the damper 140, in accordance with one or more embodiments, may be fixed between the folded module 110 and the lens module 120 inside the housing 101, and includes a support frame 141 and a cushioning member 143. The support frame 141 is fixed by being interposed between the folded module 110 and the lens module 120, and the cushioning member 143 includes a first cushioning portion 1431 fixed to the support frame 141, and a second cushioning portion 1432 disposed at a distance from the support frame 141. The second cushioning portion 1432 may be disposed parallel to at least one surface of the support frame 141. In this example, the second cushioning portion 1432 may extend integrally from the first cushioning portion 1431.

The support frame 141 includes a support portion 1411 extending in the first direction (y-axis direction in the drawing) and a fastening portion 1412 bent in the second direction (z-axis direction in the drawing) intersecting the first direction at one end of the support portion 1411. In an example, the first direction may be parallel to a direction in which the light is incident on the reflective member 111, and the second direction may be parallel to a direction of the optical axis in the lens module 120.

One end of the fastening portion 1412 may be bent again in the first direction to have a hook shape, and the hook-shaped fastening portion 1412 may function as a device that fixes the support frame 141 to the housing 101. The fastening portion 1412 has a coupling hole 145 cut along a central portion, and a protrusion corresponding to the coupling hole 145 is formed in the protruding wall 107 of the housing 101 to be coupled to each other.

The first cushioning portion 1431 may be fixed to the support portion 1411 of the support frame 141. Since the support portion 1411 extends in the first direction and is disposed to face the second direction, the first cushioning portion 1431 may also be fixed to the support portion 1411 and may be disposed to face the second direction. Additionally, the second cushioning portion 1432 extending from the first cushioning portion 1431 may also be disposed toward the second direction. In examples, since the folded module 110 and the lens module 120 are aligned along the second direction, the first cushioning portion 1431 and the second cushioning portion 1432 may be disposed toward the second direction, while being disposed to face toward the folded module 110 or to face toward the lens module 120.

In the present embodiment, the support portion 1411 of the support frame 141 has an opening 141a that penetrates in the second direction. In this example, the second cushioning portion 1432 may be disposed to correspond to the opening 141a in the second direction. Additionally, the opening 141a may be formed as a slot hole elongated along the first direction. The first cushioning portion 1431 may be fixed close to both edges spaced apart in the first direction of the opening 141a. The second cushioning portion 1432 may have a through-hole 143a that penetrates in the second direction. The through-hole 143a may be formed as a slot hole that is elongated in the first direction.

Referring to FIG. 6, the operation of the damper 140 in the camera module 100, in accordance with one or more embodiments, will now be described. In FIG. 6, the damper 140 is disposed between the folded module 110 and the lens module 120, but the first cushioning portion 1431 and the second cushioning portion 1432 are disposed to face toward the folded module 110.

When the folded module 110 flowing in the inner space of the housing 101 collides with the damper 140, it can be firstly buffered in the second cushioning portion 1432 and secondly stopped in the first cushioning portion 1431. That is, a primary impact point A may be formed in the second cushioning portion 1432, and a secondary impact point B may be formed in the first cushioning portion 1431. In an example, since the second cushioning portion 1432 is spaced apart from the support frame 141, the folded module 110 collides with the second cushioning portion 1432 and the speed of the folded module 110 may be reduced. That is, the second cushioning portion 1432 may be partially transformed into a space between the support frame 141 and performs a cushioning operation. The folded module 110 that is decelerated by an operation of the second cushioning portion 1432, is stopped by the first cushioning portion 1431.

As a result, the damper 140 has the effect of mitigating the effect of an impact between the devices flowing in the inner space of the housing 101, and reducing the annoying noise that may occur based on the impact.

In FIG. 6, it is illustrated as an example that the first cushioning portion 1431 and the second cushioning portion 1432 of the damper 140 are disposed facing the folded module 110. However, this is only an example, and the first cushioning portion 1431 and the second cushioning portion 1432 of the damper 140 may be disposed to face toward the lens module 120, or a pair of dampers 140 may be fixed by being disposed to face each other.

Figure 7:
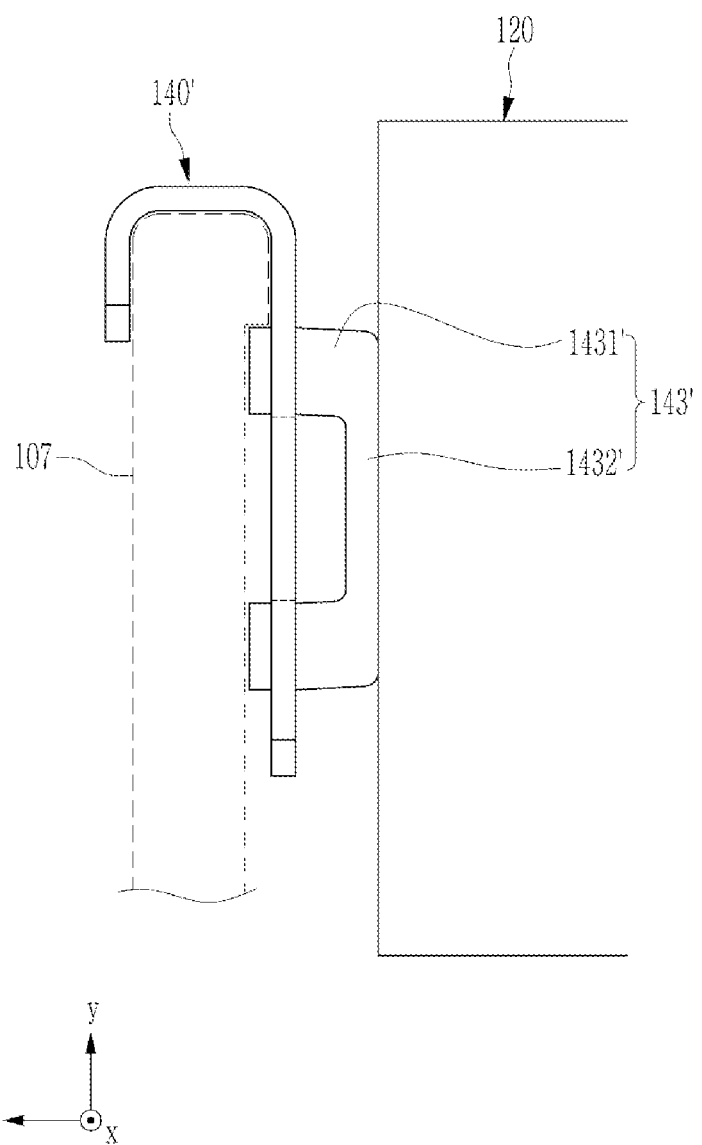
FIG. 7 illustrates a side view of a damper applied to a camera module, in accordance with one or more embodiments.
Figure 8:
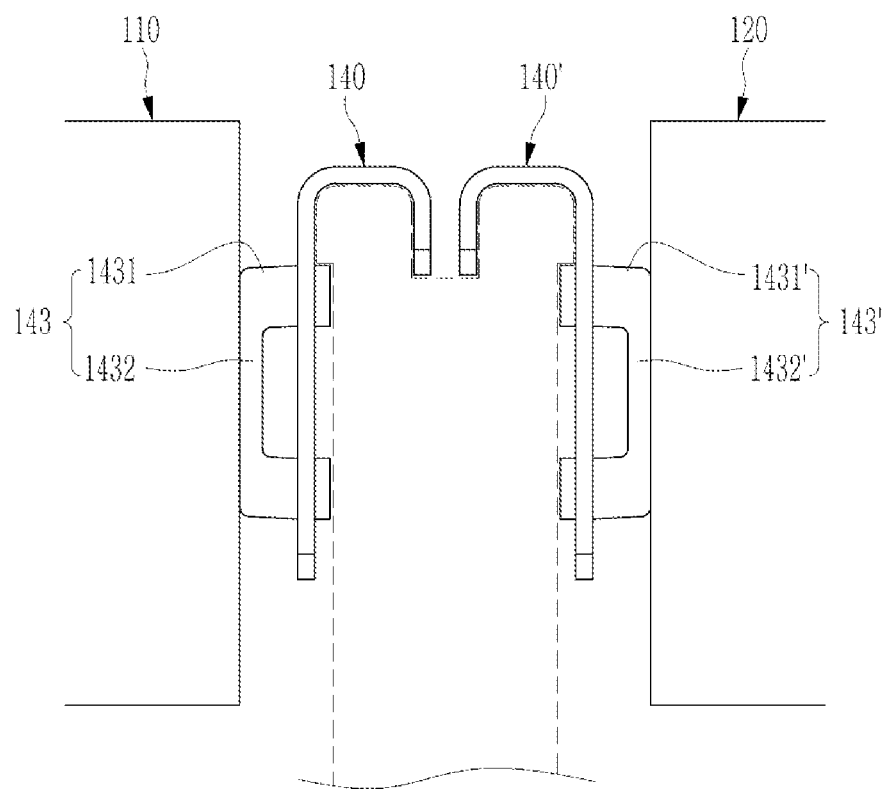
FIG. 8 illustrates a side view of a damper applied to an example camera module, in accordance with one or more embodiments.

FIG. 7 illustrates a side view of an example damper applied to a camera module, in accordance with one or more embodiments, and FIG. 8 illustrates a side view of an example damper applied to a camera module, in accordance with one or more embodiments.

Referring to FIG. 7, a first cushioning portion 1431' and a second cushioning portion 1432' of a damper 140' may be disposed to face toward a lens module 120. In this example, in the process of driving the lens module 120, the lens module 120 may collide with the first cushioning portion 1431' and the second cushioning portion 1432' of the damper 140', and the first cushioning portion 1431' and the second cushioning portion 1432' may act as described above to alleviate the effect of an impact and reduce annoying noise.

Referring to FIG. 8, a pair of dampers 140 and 140' are adjacently disposed to face each other such that first cushioning portions 1431 and 1431', and second cushioning portions 1432 and 1432' of the dampers 140 and 140' may be respectively disposed to face toward a folded module 110 and a lens module 120. During a driving process, the folded module 110 collides with the first cushioning portion 1431 and the second cushioning portion 1432 of the damper 140, and the lens module 120 collides with the first cushioning portion 1431' and the second cushioning portion 1432', and accordingly the first cushioning portions 1431 and 1431' and the second cushioning portions 1432 and 1432' may mitigate the effect of an impact, and may reduce annoying noise by operating as described above.

Figure 9:
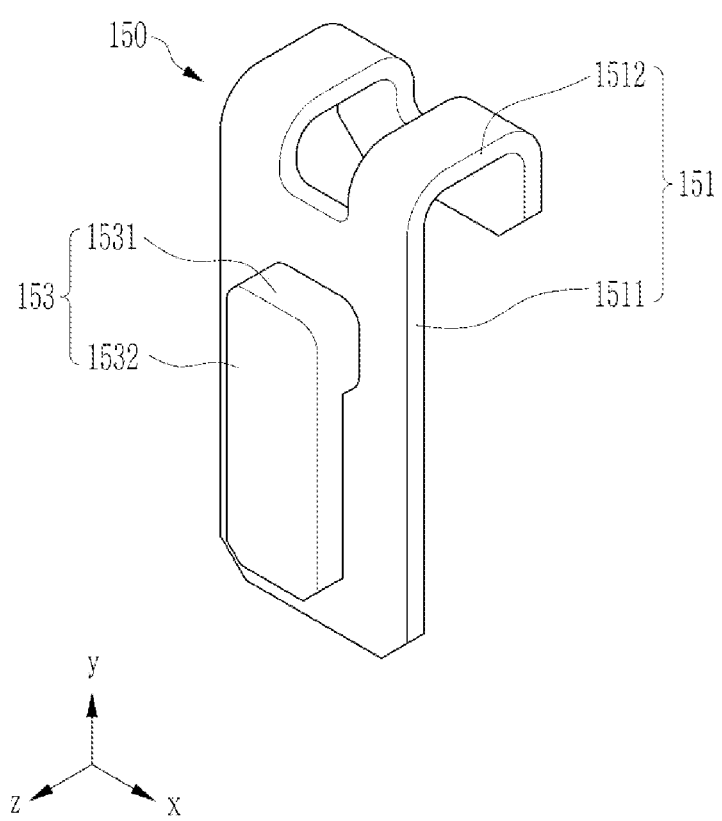
FIG. 9 illustrates a perspective view of a damper applied to the example camera module of FIG. 1, in accordance with one or more embodiments.
Figure 10:
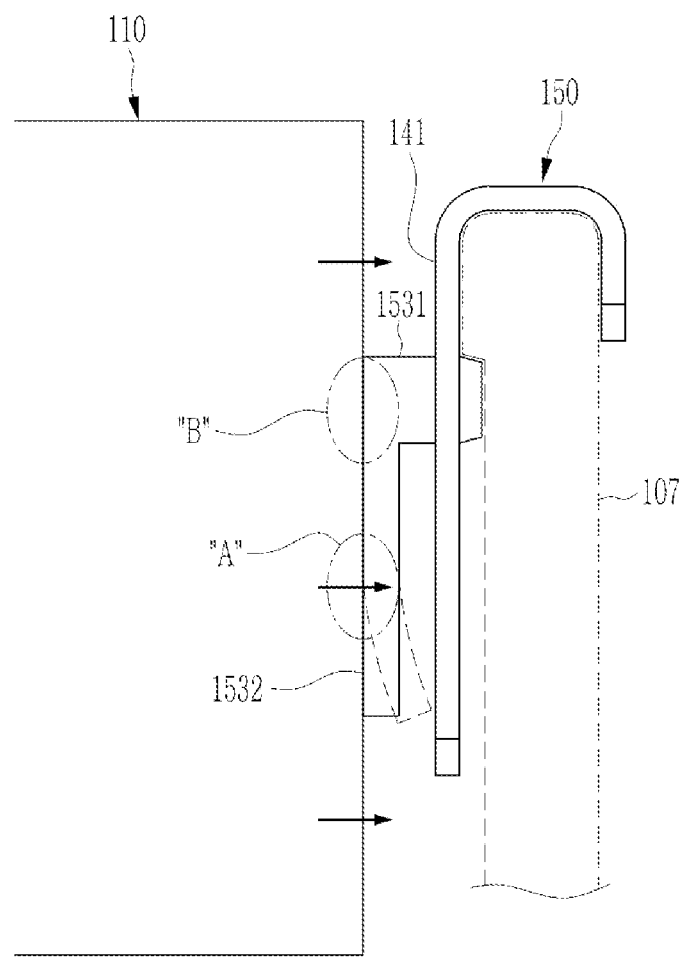
FIG. 10 illustrates a side view of the damper of FIG. 9.

FIG. 9 is a perspective view of an example damper that is applied to the example camera module of FIG. 1, in accordance with one or more embodiments, and FIG. 10 is a side view of the example damper of FIG. 9 provided for description of an operation state of the damper.

Referring to FIG. 9 and FIG. 10, a damper 150, in accordance with one or more embodiments, includes a support frame 151 and a cushioning member 153, and the cushioning member 153 includes a first cushioning portion 1531 fixed to a support frame 151 and a second cushioning portion 1532 disposed apart from the support frame 151. In this example, the second cushioning portion 1532 may extend integrally from the first cushioning portion 1531.

The first cushioning portion 1531 may be fixed to a support portion 1511 of the support frame 151. Since the support portion 1511 extends in the first direction and is disposed to face the second direction, the first cushioning portion 1531 may also be fixed to the support portion 1511, and is disposed to face the second direction. Additionally, the second cushioning portion 1532 extending from the first cushioning portion 1531 may also be disposed to face toward the second direction. In an example, since the folded module 110 and the lens module 120 are aligned along the second direction, the first cushioning portion 1531 and the second cushioning portion 1532 may be disposed to face toward the second direction while being disposed toward the folded module 110 or toward the lens module 120.

In the present embodiment, the support portion 1511 of the support frame 151 is formed in the shape of an elongated plate extending in the first direction, and the second cushioning portion 1532 extends parallel to the support portion 1511 from the first cushioning portion 1531, but may be shorter than the length of the support portion 1511. Accordingly, the cushioning member 153 may form or comprise a fixed end at the first cushioning portion 1531 and a free or open end at the end of the second cushioning portion 1532.

Referring to FIG. 10, the operation of the damper 150 in the camera module 100, in accordance with one or more embodiments, will be described as follows. In FIG. 10, the damper 150 is disposed between the folded module 110 and the lens module 120, and the first cushioning portion 1531 and the second cushioning portion 1532 are disposed toward the folded module 110.

When the folded module 110, which flows in an inner space of a housing 101, collides with the damper 150, the folded module 110 is firstly buffered at the second cushioning portion 1532 and secondly stops at the first cushioning portion 1531. That is, a primary impact point A is formed in the second cushioning portion 1532, and a secondary impact point B may be formed in the first cushioning portion 1531. In this example, since the second cushioning portion 1532 is spaced apart from the support frame 141, the folded module 110 collides with the second cushioning portion 1532 and its speed may be reduced.

That is, a free end portion of the second cushioning portion 1532 is partially transformed into a space with the support frame 151 to perform a cushioning function. Accordingly, the folded module 110 decelerated in the second cushioning portion 1532 is stopped by the first cushioning portion 1531.

As a result, the damper 150 has the effect of mitigating the effect of an impact between the moving objects in the inner space of the housing 101, and reducing the annoying noise that may occur according to the impact.

In FIG. 10, it is illustrated as an example that the first cushioning portion 1531 and the second cushioning portion 1532 of the damper 150 are disposed to face the folded module 110. However, this is only an example, and the first cushioning portion 1531 and the second cushioning portion 1532 of the damper 150 may be disposed to face toward the lens module 120, and a pair of dampers 150 may be disposed adjacent while facing each other, and thus may be disposed to face toward the folded module 110 and the lens module 120, respectively.

Figure 11:
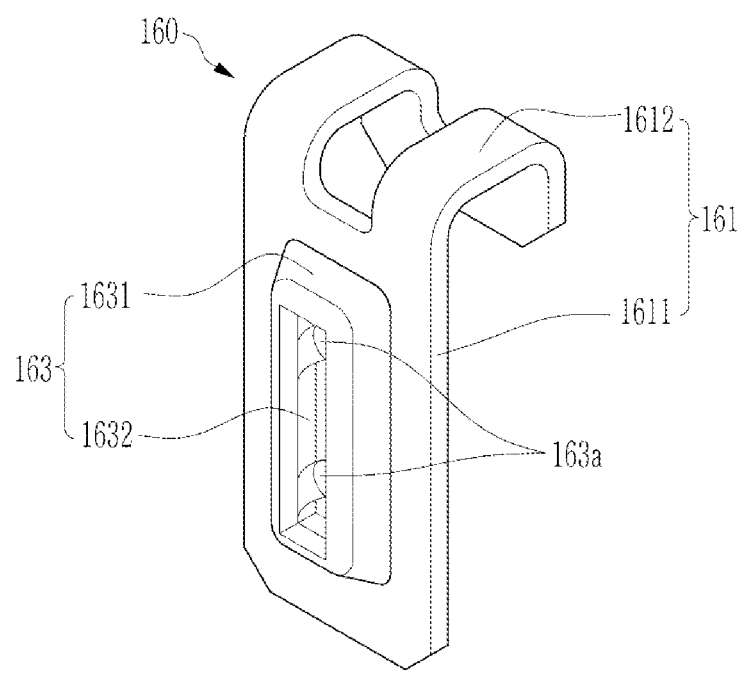
FIG. 11 illustrates a perspective view of a damper applied to the example camera module of FIG. 1, in accordance with one or more embodiments.
Figure 12:
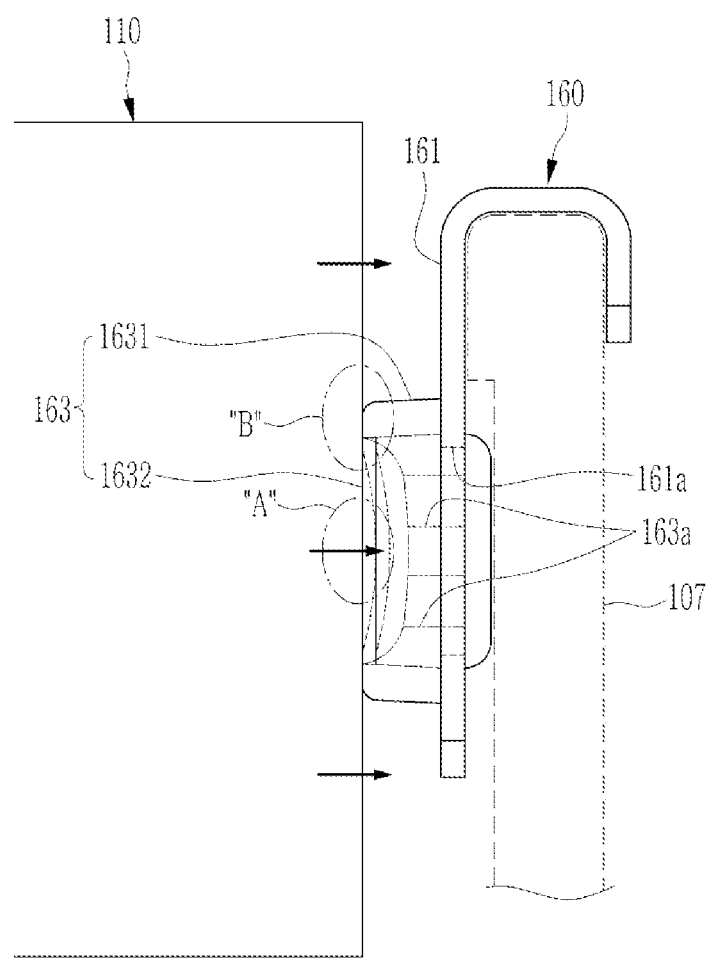
FIG. 12 illustrates a side view of the damper of FIG. 11.

FIG. 11 illustrates a perspective view of a damper applied to the camera module of FIG. 1, in accordance with one or more embodiments, and FIG. 12 is a side view of the damper of FIG. 11, provided for description of the operation state of the damper.

Referring to FIG. 11 and FIG. 12, a damper 160, in accordance with one or more embodiments, includes a support frame 161 and a cushioning member 163, and the cushioning member 163 includes a first cushioning portion 1631 fixed to the support frame 161, and a second cushioning portion 1632 that is spaced apart from the support frame 161. In this example, the second cushioning portion 1632 may be integrally formed to have a shape in which the center is depressed from the first cushioning portion 1631.

The first cushioning portion 1631 may be fixed to a support portion 1611 of the support frame 161. Since the support portion 1611 extends in the first direction and is disposed to face the second direction, the first cushioning portion 1631 may also be fixed to the support portion 1611 and may be disposed to face the second direction. Additionally, the second cushioning portion 1632 extending from the first cushioning portion 1631 may also be disposed to face toward the second direction. In an example, since a folded module 110 and a lens module 120 are aligned along the second direction, the first cushioning portion 1631 and the second cushioning portion 1632 may be disposed toward the second direction, while facing toward the folded module 110 or toward the lens module 120.

In the present embodiment, the support portion 1611 of the support frame 161 has an opening 161a that penetrates in the second direction. In this example, the first cushioning portion 1631 may be fixed to surround an edge of the opening 161a, and the second cushioning portion 1632 may be disposed to correspond to the opening 161a in the second direction. Additionally, the second cushioning portion 1632 may extend from the first cushioning portion 1631 toward a center of the opening 161a, and may be formed at a lower height than a height of the first cushioning portion 1631 with respect to the surface of the support portion 1611 to form a recess portion. The second cushioning portion 1632 may have a through-hole 163a that penetrates in the second direction, and the through-hole 163a may be formed of a plurality of pieces aligned along the second direction.

Referring to FIG. 11, the operation of the damper 160 in the camera module 100, in accordance with one or more embodiments, is described as follows. In FIG. 11, the damper 160 is disposed between the folded module 110 and the lens module 120, but the first cushioning portion 1631 and the second cushioning portion 1632 are disposed toward the folded module 110.

When the folded module 110 flowing in the inner space of the housing 101 collides with the damper 160, it can be firstly buffered in the second cushioning portion 1632 and secondly stopped in the first cushioning portion 1631. That is, a primary impact point A is formed in the second cushioning portion 1632, and a secondary impact point B may be formed in the first cushioning portion 1631. The secondary impact point B may be formed at an upper area of the first cushioning portion 1631, and a lower area of the first cushioning portion 1631. In this example, since the second cushioning portion 1632 is disposed to correspond to the opening 161a of the support frame 161, the folded module 110 collides with the second cushioning portion 1632 and the speed can be reduced. That is, the second cushioning portion 1632 may be partially deformed into the opening 161a of the support frame 161 to perform a cushioning function. Accordingly, the folded module 110 that is decelerated by the second cushioning portion 1632, is stopped by the first cushioning portion 1631.

As a result, the damper 140 has the effect of mitigating the effect of an impact between the devices flowing in the inner space of the housing 101 and reducing the annoying noise that may occur according to the impact.

In FIG. 11, it is illustrated as an example that the first cushioning portion 1631 and the second cushioning portion 1632 of the damper 160 are disposed to face the folded module 110, but the first cushioning portion 1531 and the second cushioning portion 1532 of the damper 150 may be disposed to face toward the lens module 120, and a pair of dampers 160 may be disposed adjacent while facing each other, and thus may be disposed toward the folded module 110 and the lens module 120, respectively.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing comprising an inner space;
    a folded module comprising a reflective member configured to reflect light incident from the outside, and change a path of the light, and a moving holder to which the reflective member is mounted, wherein the folded module is disposed in the inner space of the housing, and is movably supported on an inner wall of the housing;
    a lens module that is disposed to a rear of the folded module in the inner space, and comprising a lens barrel including a plurality of lenses aligned in an optical axis direction and configured to allow the light reflected from the reflective member to pass therethrough; and
    a damper comprising a support frame fixed between the folded module and the lens module in the housing and configured to be fit onto a protruding wall of the housing that protrudes from a sidewall of the housing into the inner space, a cushioning member comprising a first cushioning portion fixed to the support frame, and a second cushioning portion that extends integrally from the first cushioning portion, and is spaced apart from the support frame by the first cushioning portion,
    wherein the cushioning member comprises a groove that is disposed between an outer surface of the support frame and the second cushioning portion, and the groove has a width in the optical axis direction.

2. The camera module of claim 1, wherein:
    the support frame comprises a support portion that extends in a first direction, and a fastening portion that is bent in a second direction that intersects the first direction at one end of the support portion, and the first cushioning portion is fixed to the support portion.

3. The camera module of claim 2, wherein:

the first direction is parallel to a direction in which the light is incident on the reflective member, and the second direction is parallel to a direction of the optical axis, and the first cushioning portion and the second cushioning portion are disposed to face the second direction.

4. The camera module of claim 3, wherein the first cushioning portion and the second cushioning portion are disposed to face the folded module.

5. The camera module of claim 3, wherein the first cushioning portion and the second cushioning portion are disposed to face toward the lens module.

6. The camera module of claim 2, wherein the fastening portion comprises a coupling hole cut along a central portion of the fastening portion.

7. The camera module of claim 2, wherein:

the support portion comprises an opening that penetrates in the second direction, and the second cushioning portion is disposed to correspond to the opening in the second direction.

8. The camera module of claim 7, wherein:

the opening is formed as a slot hole that extends in the first direction, and the first cushioning portion is fixed to both edges of the opening spaced apart in the first direction.

9. The camera module of claim 7, wherein the second cushioning portion comprises a through-hole that penetrates in the second direction.

10. The camera module of claim 9, wherein the through-hole is formed as a slot hole that extends in the first direction.

11. The camera module of claim 2, wherein the second cushioning portion extends in parallel with the support portion from the first cushioning portion.

12. The camera module of claim 11, wherein the second cushioning portion forms a free end at an end that is separated from the first cushioning portion.

* * * * *